US007634580B2

(12) United States Patent
Preimesberger et al.

(10) Patent No.: US 7,634,580 B2
(45) Date of Patent: Dec. 15, 2009

(54) UNIT TIME SYNCHRONIZATION TECHNIQUES IN A MANUFACTURING ENVIRONMENT

(75) Inventors: Lee Preimesberger, Ft. Collins, CO (US); Bertrand Bobillier, Le Buisson (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 850 days.

(21) Appl. No.: 11/259,576

(22) Filed: Oct. 26, 2005

(65) Prior Publication Data

US 2007/0094584 A1 Apr. 26, 2007

(51) Int. Cl.
*G06F 13/00* (2006.01)

(52) U.S. Cl. ........................ 709/248; 709/203; 709/219; 709/223

(58) Field of Classification Search ................. 709/201, 709/202, 203, 217, 219, 223, 248
See application file for complete search history.

(56) References Cited

U.S. PATENT DOCUMENTS 6,023,769 A * 2/2000 Gonzalez .................... 713/400
6,202,070 B1 3/2001 Nguyen et al.
7,023,816 B2 * 4/2006 Couillard .................... 370/324
2002/0078243 A1 * 6/2002 Rich et al. .................. 709/248
2005/0258806 A1 * 11/2005 Janik et al. .................. 320/155
2006/0208093 A1 * 9/2006 Cromer et al. .............. 235/492

OTHER PUBLICATIONS

Mills; "Network Time Protocol (Versioni 3);" University of Delaware; Mar. 1992; pp. 1-120.

* cited by examiner

*Primary Examiner*—Viet Vu

(57) ABSTRACT

Embodiments of the present disclosure provide systems and methods for synchronizing computer time in a computer manufacturing environment. Briefly described, in architecture, one embodiment of the system, among others, can be implemented as follows. The system includes a computer network with a server maintaining timing information, the server communicatively coupled to a newly assembled computer via the computer network; time configuration logic which can be executed on the newly assembled computer which performs the actions of retrieving timing information from the server; and configuring a local clock on the newly assembled computer to a date and time corresponding to the timing information; and time transmittal logic which can be executed on the server which performs the action of transmitting the timing information over the computer network. Other systems and methods are also provided.

20 Claims, 6 Drawing Sheets

UNIT TIME SYNCHRONIZATION TECHNIQUES IN A MANUFACTURING ENVIRONMENT

BACKGROUND

Often in manufacturing, a newly manufactured computer machine is set to a generic date and time for each machine that is not intended to be accurate. For example, each unit may have 3 May 2003 assigned to the local real time clock on the motherboard of the machine. Alternatively, a rough approximation of the correct time is often used. For instance, many newly manufactured computer machines or systems created today have their local internal clock set to the current time in central standard time (CST), which results in computer systems created in Europe having a time 6-7 hours off when shipped from the manufacturing facility.

Incorrect timing information may cause problems during manufacturing for computer systems, such as preventing software from being installed correctly. For example, the Microsoft Windows XP® operating system may not work correctly with some dates that are provided by a local internal clock of a computer system. Further, some enterprise log in systems operate off of time stamps, and if a local clock of a computer machine is not within time parameters for that log-in to work, the computer machine will be unable to log a user on a computer network.

Additionally, for customer specials and builds for certain regions, the difference between time maintained on a computer system and the accurate time for the region may result in either a poor customer experience from an obviously invalid time, or additional manufacturing cost for large customers that require the correct time to be set on all computer systems, which currently needs to be done by hand. For many environments, such as corporations, that have many computer machines, it may be overly burdensome to set the date and time information for hundreds or thousands of machines, especially if a particular user of a machine is not capable or not authorized to set timing information himself or herself. For example, this may require one person to set the time and date information for all of these machines.

Standard methods of setting the unit time are insufficient for this task, since they either do not communicate time zone differences well or require custom configuration and large amounts of time to truly synchronize local timing information with a reference clock. For example, with some approaches require a computer machine to connect with an external server for timing information. This is a problem during manufacturing, however, since external network connections are typically not provided. After manufacturing and shipping to a consumer, this is also a problem because some customers have firewall security measures that prevent computer machines from connecting to external servers.

As mentioned previously, some approaches also take a long time to synchronize the time maintained on a computer machine with time maintained on a network server. For manufacturing, where it may take 2 hours (or less) to assemble a machine, this is problematic, since there is not enough time to synchronize the time maintained on a newly assembled machine with the time maintained on a network server.

SUMMARY

Embodiments provide systems and methods for synchronizing computer time in a computer manufacturing environment. Briefly described, in architecture, one embodiment of the system, among others, can be implemented as follows. The system includes a computer network with a server maintaining timing information, the server communicatively coupled to a newly assembled computer via the computer network; time configuration logic which can be executed on the newly assembled computer which performs the actions of retrieving timing information from the server; and configuring a local clock on the newly assembled computer to a date and time corresponding to the timing information; and time transmittal logic which can be executed on the server which performs the action of transmitting the timing information over the network.

Alternative embodiments can also be viewed as providing methods for setting timing information in newly manufactured computer systems by a computer manufacturer. In this regard, one embodiment of such a method, among others, can be broadly summarized by the following: assembling hardware components into a predetermined hardware configuration to create a computer system; transmitting timing information over the computer network for synchronizing an internal clock of the computer system with the timing information; retrieving the timing information via the computer system from the computer network; and setting the internal clock of the computer system to correspond to retrieved timing information.

BRIEF DESCRIPTION OF THE DRAWINGS

Many aspects of the present disclosure can be better understood with reference to the following drawings. The following drawings merely represent possible embodiments, among others, of the present disclosure in order to set forth a clear understanding of the principles of the disclosure. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Pre-installation of software and pre-configuration of hardware to prevent incompatibilities or incorrect installation at the consumer level requires careful software and hardware management. This management takes place, not only prior to, but also during the manufacturing process.

With regard to software, pre-installation is accomplished through creation of disk images, in many manufacturing environments. A disk image is a file that holds a copy of all of the data, including partitioning and driver information, contained on a given storage medium (usually a hard disk drive). Disk images are usually prepared by a software engineering group once a personal computer has been configured with all of the appropriate components (operating system, applications, utilities, terminate and stay resident programs (TSRs), etc.). This configured computer is referred to as a "master." The disk images themselves are then replicated and distributed to remote manufacturing sites for installation on consumer machines.

Configuration and installation of software and hardware takes place prior to packing a newly manufactured computer machine or unit for shipping in order to provide the consumer with a unit that is operable ("ready to run") upon receipt. Configuration of the unit encompasses partitioning the unit's hard drive, setting up boot information, and adding file directory structure information. Installation is the process of writing the physical software files to the hard drive and configuring any necessary hardware.

Figure 1:
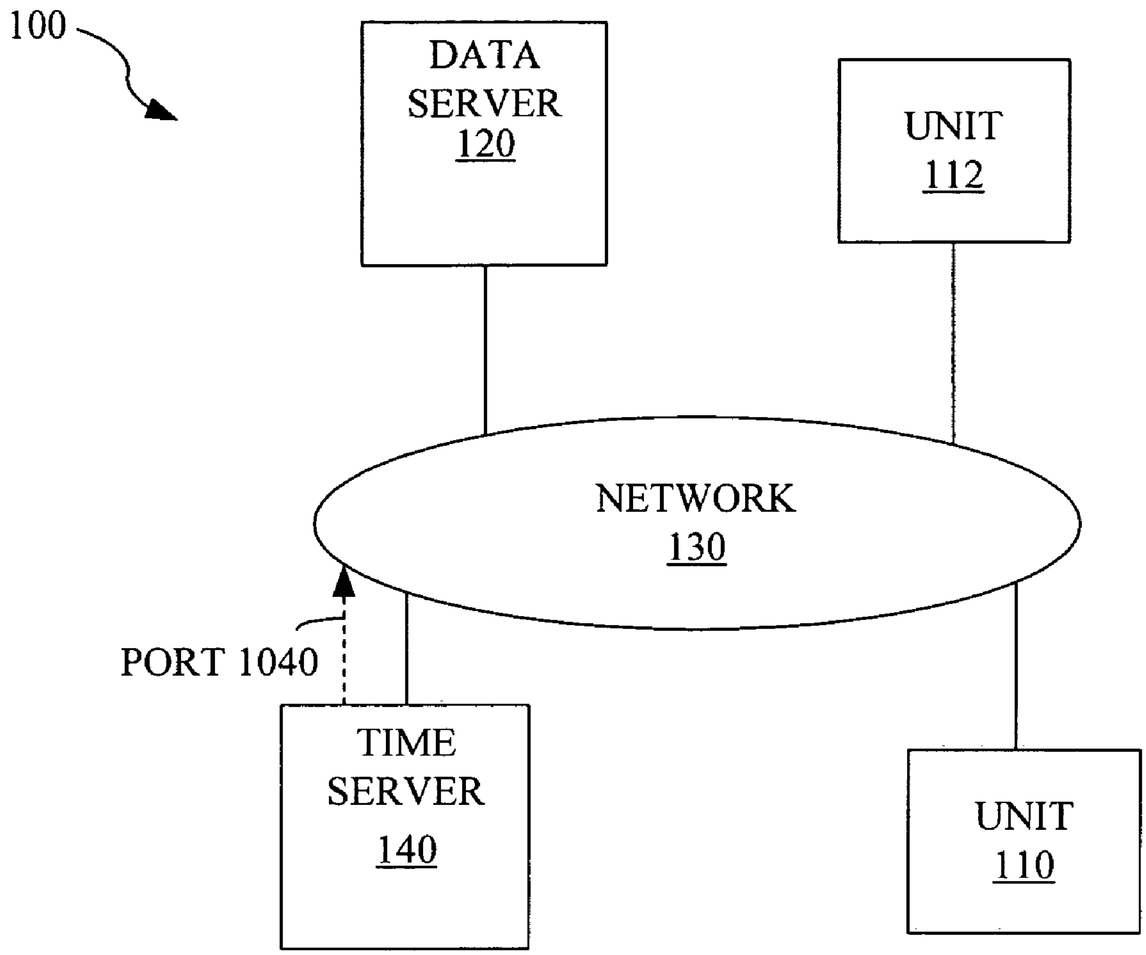
FIG. 1 is a block diagram illustrating one embodiment of a system for synchronizing time in a computer manufacturing environment.

FIG. 1 schematically shows a network in one embodiment of a timing synchronization system 100 for synchronizing computer time in a computer manufacturing environment. At the facility, newly manufactured computer units 110, 112 can be preinstalled with software. If software is to be pre-installed on the single unit computer 110, the computer provides its own connectivity to a data server 120. A data server 120 (which is, but not limited to, an SQL server in this example) provides data (disk images and/or files) to newly manufactured computers 110, 112 over a network 130 via a download process. In some embodiments, the network 130 is a restrictive network that may be localized within a manufacturing facility and not connected to other external networks, such that the network 130 is accessible by users at the manufacturing facility where the network 130 is located.

A time server 140 also provides time and date information over the network connection 130 that is received by newly manufactured computers 110, 112. Although the time server 140, in this example, is shown as a separate server, in some embodiments, functionality of the time server 140 may be performed by a data server 120 or other computer devices connected to the network 130.

The download process for providing data to the newly manufactured machines 110, 112 is initiated by a single machine 110 on which logic will be installed. The download process is executed from a boot diskette inserted into the newly assembled or manufactured computer 110. The boot diskette contains the information necessary for the machine 110, as operated in the factory, to locate the data server 120. The single machine 110 then establishes a connection with a unique identifier (ID) with the data server 120; identifies the drive to be loaded; determines which files to download; determines which diagnostics need to be run upon download completion; verifies part serial numbers; and updates itself from the server 120 in the event of a new floppy disk boot version. In addition, the single machine 110 also performs the processes of acquiring and configuring correct timing information from the time server 140.

Generally, a manufactured computer 110 stores in memory a process for retrieving a timing datagram being periodically transmitted by the time server 140. The datagram contains timing information for the correct date and time in terms of GMT (Greenwich Means Time) and identification of the time zone for the manufacturing facility. The computer 110 monitors the network in order to detect a timing datagram on the network 130. After a timing datagram is detected, the computer 110 retrieves the timing datagram from the network 130. The computer 110 utilizes the timing information to set or configure its local internal clock to the correct time and saves the time zone information to a reserved area on a hard drive of the computer 110. Therefore, after shipment from the manufacturing facility, the manufactured computer 110 is already configured with the correct timing information, including time zone information.

In one embodiment, a background service or daemon process runs on one or more authoritative time servers 140 on the manufacturing network 130. In a designated period (e.g., every 30 seconds), the daemon process broadcasts a datagram with timing information on port 1040 of a time server 140 across the network 130 for manufactured computers 110, 112. In alternative embodiments, the daemon process runs on one or more data servers 120. The datagram, in one embodiment, contains the following information:

```
Typedef Struct
{
Uint8_t Version; // currently defined as 1
Uint32_T CurrentTime; // the local time on the time server in
POSIX format
int8_t GMTOffset; // the offset in hours from GMT (−23-+23 )
Uint8_t Unused[ 512-48 ]; // reserved for expansibility
}
TPacket, *PTPacket;
```

Correspondingly, an illustrative pseudocode for the daemon process as stored in memory of the time server 140, for one embodiment, among others, is as follows:

```
OutSocket = new DatagramSocket( 1020 );
OutPacket = new TPacket;
While ( true )
{
Sleep 30;
OutPacket.Version = 1;
OutPacket.GMTOffset = tzset( );
OutPacket.CurrentTime = time( );
Send OutSocket, OutPacket;
}
```

Further, an illustrative pseudocode for detecting and retrieving a transmitted datagram on a manufactured computer machine 110, for one embodiment, among others, is as follows.

```
InSocket = new DatagramSocket( 1020 );
InPacket = new TPacket;
Recv InSocket, InPacket;
If ( InPacket.Version != 1 ){Print "Invalid packet from network";}
Else
{
timeset( InPacket.CurrentTime );
WriteTZToUIA( InPacket.GMTOffset );
}
```

Since, most manufactured machines 110, 112 in the manufacturing process are connected to the network 130 at some point (e.g., either for download, unit logout to a site data collection and tracking system, or most frequently to both), each manufactured machine 110 may be configured to listen or monitor the network 130 for timing datagrams (e.g., on socket 1040) and set the local time for the machine 110 at any point in the download process. For example, in one embodiment, during download and logout, the manufactured machine 110 listens for the datagram, sets the local internal clock to the value defined in CurrentTime, and then preserves the time zone of the machine 110 in the 'UIA' or reserved area of the hard disk of the manufactured machine 110. Further, for additional precision, the manufactured machine 110 may also be configured, in some embodiments, to adjust the incoming time stamp in the datagram by the clock skew detected on the incoming datagram. However, in many manufacturing sites, this is not utilized, since the network latency for the network 130 is typically less than half a second.

Manufactured machines 110, 112 are often built in a manufacturing facility in the same time zone as the location where the machines are to be shipped. Thus, the local clock of a manufactured machine 110 is correct when the customer turns the machine 110 on for the first time. Additionally, using the time zone information stored in the reserved area of the hard drive of the machine 110, a software clock of the operating system for the machine 110 may be automatically set to this information without any interaction from the user.

For example, a typical start-up procedure for the Microsoft Windows® operating system can be bypassed and be provided with information stored locally on the newly manufactured machine 110. Thus, many steps in the start-up procedure are capable of being automatically completed without involvement of a user, such as setting a time zone setting for the operating system via aid of the locally stored time zone information. In addition, the time zone information may also be made available to other software applications that make valuable use of this information from the reserved area of the hard drive.

There are many types of environments that exist for computer assembly and software pre-installation at manufacturing facilities that are contemplated by the present disclosure. One embodiment, among others, of an assembly environment assumes that there are discrete areas where hardware subassemblies are assembled into computer systems. In this area, several network drops are available to connect assembled units or manufactured machines to a data server 120 for software download. At any one of these network drops, the manufactured machine may monitor and listen for datagrams being transmitted by the time server 140, in accordance with embodiments of the present disclosure, where the datagrams contain accurate timing information.

In one example, during manufacturing, after a boot diskette is inserted in the newly manufactured machine 110, the machine is powered on. Diagnostic, software download, and time synchronization routines on the boot diskette are loaded into memory of the machine 110 and executed automatically. Generally, after the software download process is completed, diagnostics and software configuration processes are initiated. In addition, a process for synchronizing timing information maintained on the newly manufactured machine 110 with timing information transmitted by the time server 140 is initiated after the download is complete, in some embodiments. Alternatively, the process for configuring timing information may be performed during the download process. Then, after each of the processes is complete, the newly manufactured machine 110 is packed and ready for shipment.

Figure 2:
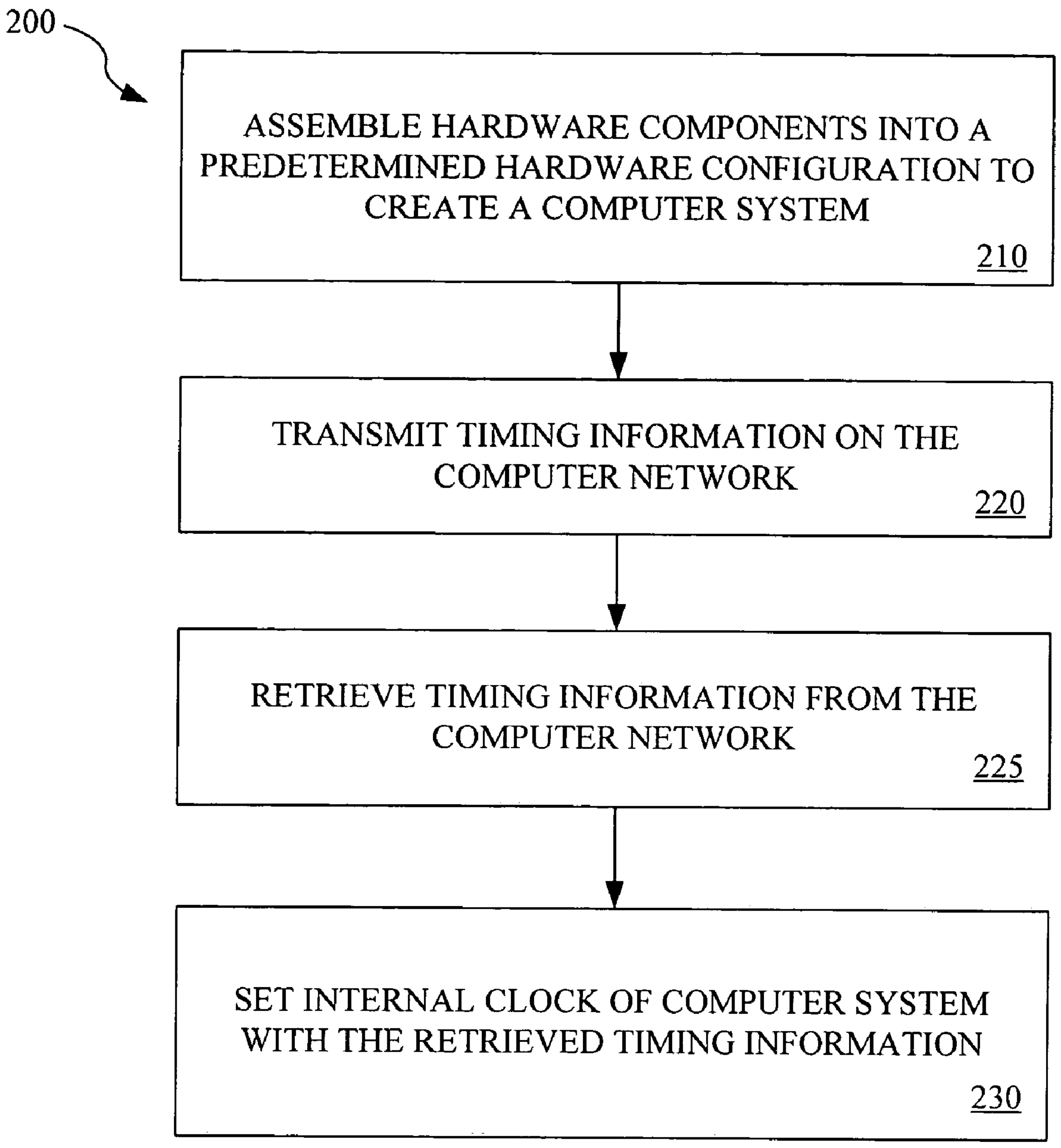
FIG. 2 is a flowchart describing one embodiment, among others, of a method for synchronizing time in a computer manufacturing environment in accordance with the system of FIG. 1.

FIG. 2 shows a flowchart 200 illustrating a process used by an embodiment of the timing synchronization system 100 (FIG. 1). The process begins at block 210 at a manufacturing facility. At block 210, hardware components are assembled into a predetermined hardware configuration to create a computer system. On a computer network 130, timing information is transmitted, as described in block 220. While on the network 130, the computer system retrieves timing information from the computer network 130, as described in block 225. Then, in block 230, the internal clock of the computer system 110 is set to correspond to the retrieved timing information.

As such, in some embodiments, a newly assembled computer unit or machine 110 is connected to a manufacturing network in order to download data from a data server 120 located on a manufacturing network 130. While on the network 130, the newly assembled computer unit 110 retrieves timing information (including date and time) that is periodically broadcasted by an authoritative time server 140 located on the network 130. The newly assembled computer unit 110 utilizes the timing information (e.g., from a datagram) to set an internal clock of the newly assembled computer unit. In one embodiments, the internal clock is set to a time that substantially corresponds to the retrieved timing information. In addition, in some embodiments, the newly assembled machine 110 stores time zone information procured from the timing information in a reserved area of a hard drive on the assembled machine 110. The newly assembled unit 110 is then disconnected from the network with the local clock maintaining accurate time settings before the assembled machine is ever shipped to another location.

Upon initial start up of the machine 110 at a shipped location, the assembled machine 110 utilizes the time settings from the local clock and the time zone information from the reserved area of the hard drive to automatically set or configure software time settings. For example, an operating system may be configured or programmed to automatically set time settings (for a software clock) maintained by the operating system using information maintained by the local clock and stored in reserved areas of the assembled machine.

In various embodiments, a newly manufactured machine 110 is to be shipped to a location in the same time zone as a manufacturing facility. However, in some embodiments, it may be contemplated that a newly manufactured machine 110 may be shipped to a location having a different time zone. Therefore, in some embodiments, time zone information stored in a reserved area of a newly manufactured machine may be customized according to a particular shipping location for the newly manufactured machine. For example, an operator or an automated process may set the time zone information to a time zone that corresponds to a shipping location, where the newly manufactured machine is to be shipped.

Figure 3:
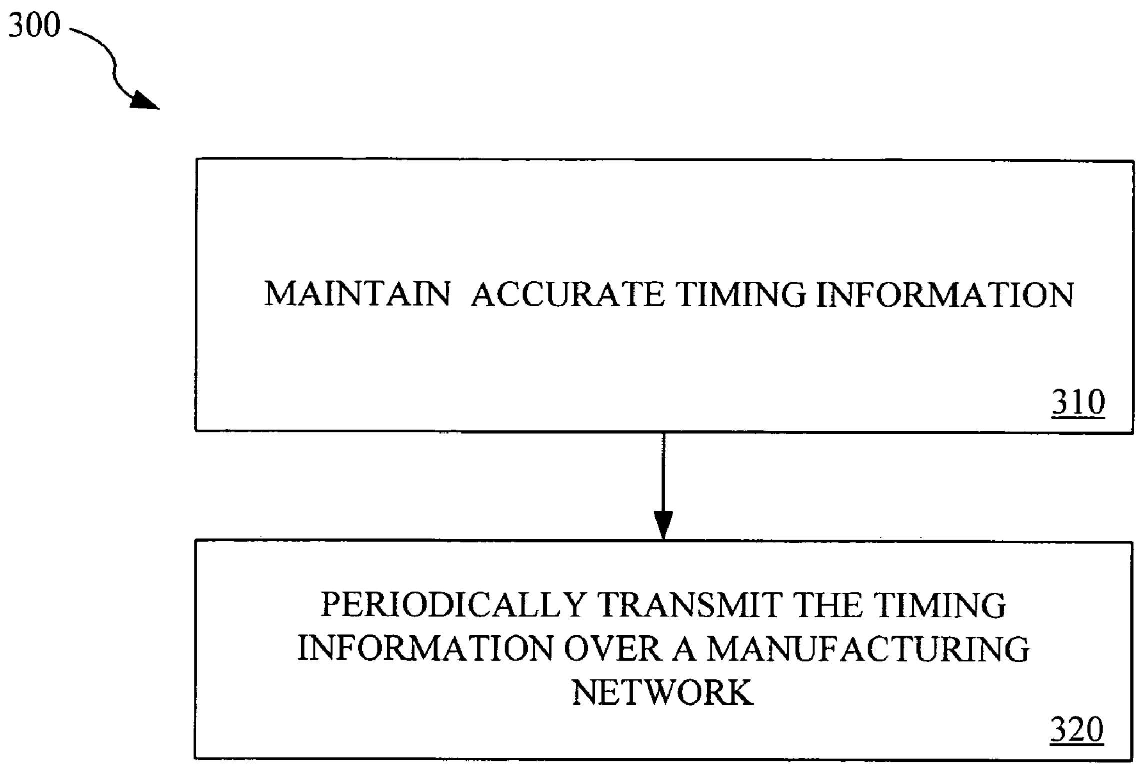
FIG. 3 is a flowchart describing one embodiment, among others, of a method for transmitting timing information across a manufacturing network in accordance with the system of FIG. 1.

FIG. 3 shows a flowchart 300 illustrating a process used by an embodiment of a time server 140 (FIG. 1). This time transmittal process 300 begins in block 310 at a manufacturing facility. In block 310, accurate timing information is maintained (e.g., date and time by a time server 140). Further, the accurate timing information is periodically transmitted over a manufacturing network 130, as described in block 320.

The accurate timing information is used to set a local clock of a newly manufactured computer that is listening on the manufacturing network. For example, a computer server 140 may be installed with a software routine that sends a datagram packet of timing information (e.g., current date and time) over the manufacturing network 130. In some embodiments, the timing information also includes time zone information.

Figure 4:
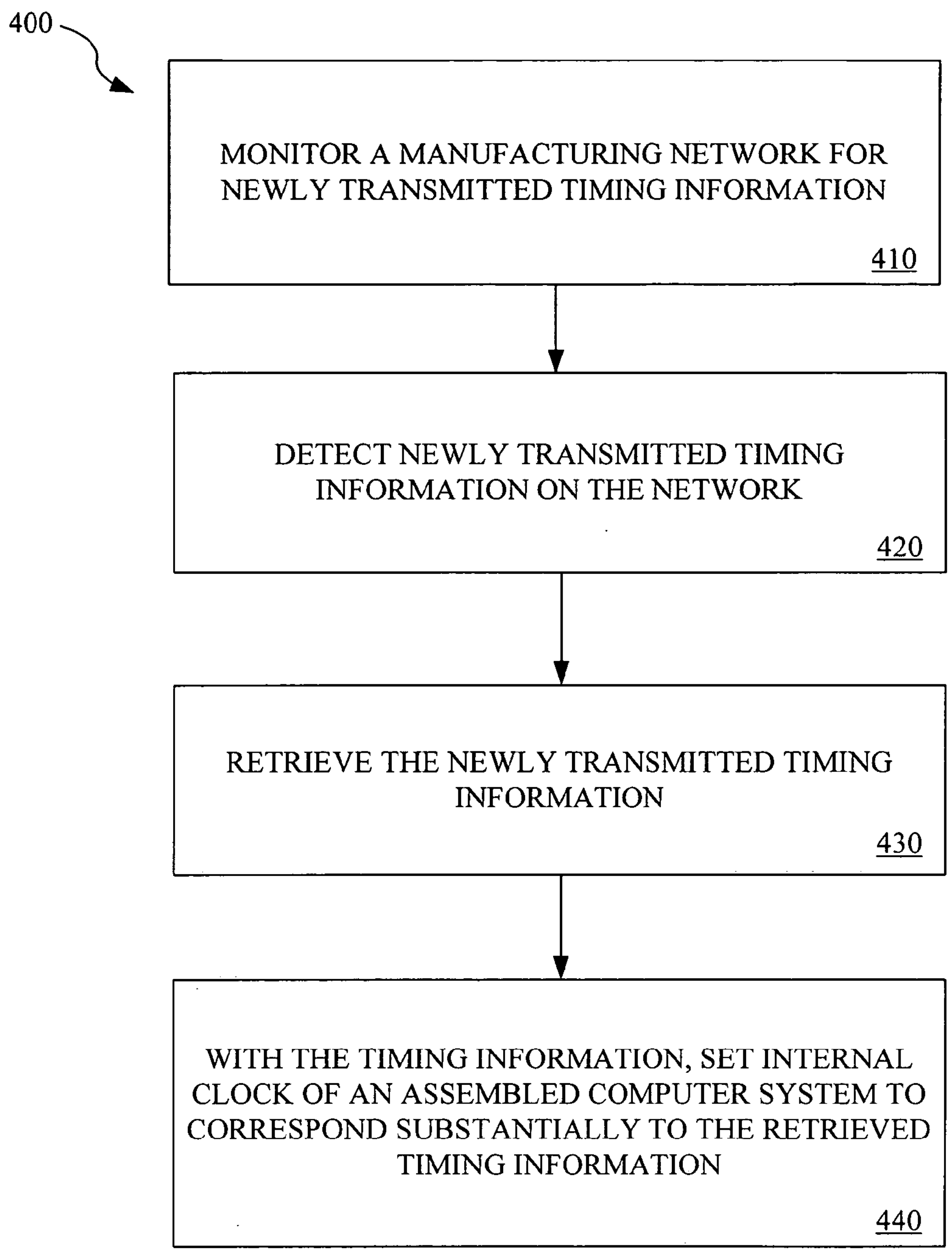
FIG. 4 is a flowchart describing one embodiment, among others, of a method for synchronizing timing information in a manufacturing environment in accordance with the system of FIG. 1.

Next, FIG. 4 shows a flowchart 400 illustrating a process used by an embodiment of a newly manufactured computer machine 110 (FIG. 1). This time configuration process 400 begins in block 410 in a manufacturing environment. In block 410, a manufacturing network is monitored for newly transmitted timing information. After detection of newly transmitted timing information, in block 420, the newly transmitted timing information is retrieved (e.g. by a newly assembled computer system 110), as described in block 430. With the timing information, the an internal clock of an assembled computer system is set to correspond substantially to retrieved timing information, as illustrated in block 440.

Accordingly, in one embodiment, after a computer machine 110 is assembled at a manufacturing facility and the assembled machine 110 is connected or communicatively coupled to a manufacturing network 130 at a manufacturing facility, the assembled machine 110 monitors or listens for timing information to be transmitted over the manufacturing network. For example, the assembled machine 110 may be installed with a software routine in memory that configures the machine 110 to perform many of these steps. Thus, after detecting and retrieving timing information from the manufacturing network 130, the assembled machine is configured to automatically set settings of software applications stored on a hard drive of the machine 110 to accurate date and time information at an initial startup of the machine 110 after the machine 110 is shipped to a new location from the manufacturing facility.

Figure 5:
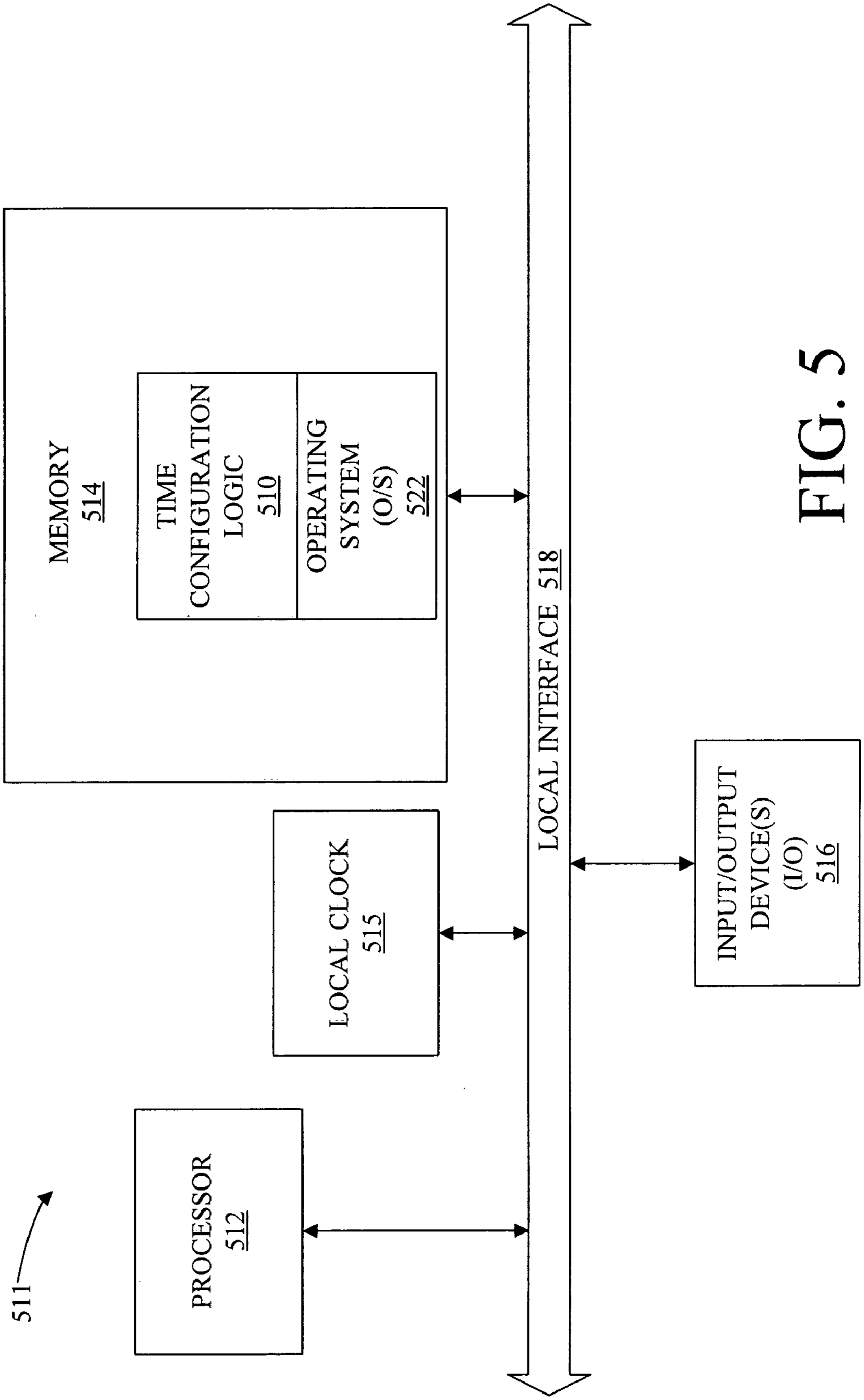
FIG. 5 is a block diagram of a general-purpose computer that can implement a system for synchronizing timing information in a manufacturing environment in accordance with FIG. 1.

In one embodiment, a system for implementing the time configuration process 400 is implemented in software, as an executable program, and is executed by a manufactured computer, such as a personal computer (PC; IBM-compatible, Apple-compatible, or otherwise), workstation, minicomputer, or mainframe computer. An example of a general-purpose computer that can implement such a system for synchronizing timing information in a manufacturing environment is shown in FIG. 5. In FIG. 5, time configuration logic for synchronizing timing information in a manufacturing environment is denoted by reference numeral 510.

Generally, in terms of hardware architecture, as shown in FIG. 5, the computer 511 includes a processor 512, memory 514, local clock 515, and one or more input and/or output (I/O) devices 516 (or peripherals) that are communicatively coupled via a local interface 518. The processor 512 is a hardware device for executing logic, that may be stored in memory 514 or in another suitable memory device as software.

The memory 514 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 514 may incorporate electronic, magnetic, optical, and/or other types of storage media. Note that the memory 514 can have a distributed architecture, where various components are situated remote from one another, but can be accessed by the processor 512.

The software in memory 514 may include one or more separate programs, each of which comprises an ordered listing of executable instructions for implementing logical functions. In the example of FIG. 5, the software in the memory 514 includes time configuration logic 510 for synchronizing and configuring computer timing information in a manufacturing environment in accordance with an embodiment of the present disclosure and a suitable operating system (O/S) 522. The operating system 522 essentially controls the execution of other computer programs, such as the time configuration logic 510, and provides scheduling, input-output control, file and data management, memory management, and communication control and related services.

The time configuration logic 510 is a source program, executable program (object code), script, or any other entity comprising a set of instructions to be performed. The I/O devices 516 may include input devices, for example but not limited to, a keyboard, mouse, scanner, microphone, etc. Furthermore, the I/O devices 516 may also include output devices, for example but not limited to, a printer, display, etc. Finally, the I/O devices 516 may further include devices that communicate both inputs and outputs, for instance but not limited to, a modulator/demodulator (modem; for accessing another device, system, or network 130), a radio frequency (RF) or other transceiver, a telephonic interface, a bridge, a router, etc.

If the computer 511 is a PC, workstation, or the like, the software in the memory 514 may further include a basic input output system (BIOS) (omitted for simplicity). The BIOS is a set of essential software routines that initialize and test hardware at startup, start the O/S 522, and support the transfer of data among the hardware devices. The BIOS is stored in ROM so that the BIOS can be executed when the computer 511 is activated.

When the computer 511 is in operation, the processor 512 is configured to execute software stored within the memory 514, to communicate data to and from the memory 514, and to generally control operations of the computer 511 pursuant to the software. The logic 510 and the O/S 522, in whole or in part, but typically the latter, are read by the processor 512, perhaps buffered within the processor 512, and then executed.

When the time configuration logic 510 for synchronizing timing information in a manufacturing environment is implemented in software, as is shown in FIG. 5, it should be noted that the logic 510 can be stored on any computer readable medium for use by or in connection with any computer related system or method. In the context of this document, a computer readable medium is an electronic, magnetic, optical, or other physical device or means that can contain, store, propagate, or transport a computer program for use by or in connection with a computer related system or method.

Similarly, in one embodiment, time transmittal logic 610 is implemented in software, as an executable program, and is executed by a computer, such as a computer server, general-purpose computer, or mainframe computer that is configured as a time server 140. An example of a general-purpose computer that can implement the time transmittal logic 610 for performing the functionality of the time transmittal process 300 is shown in FIG. 6.

Figure 6:
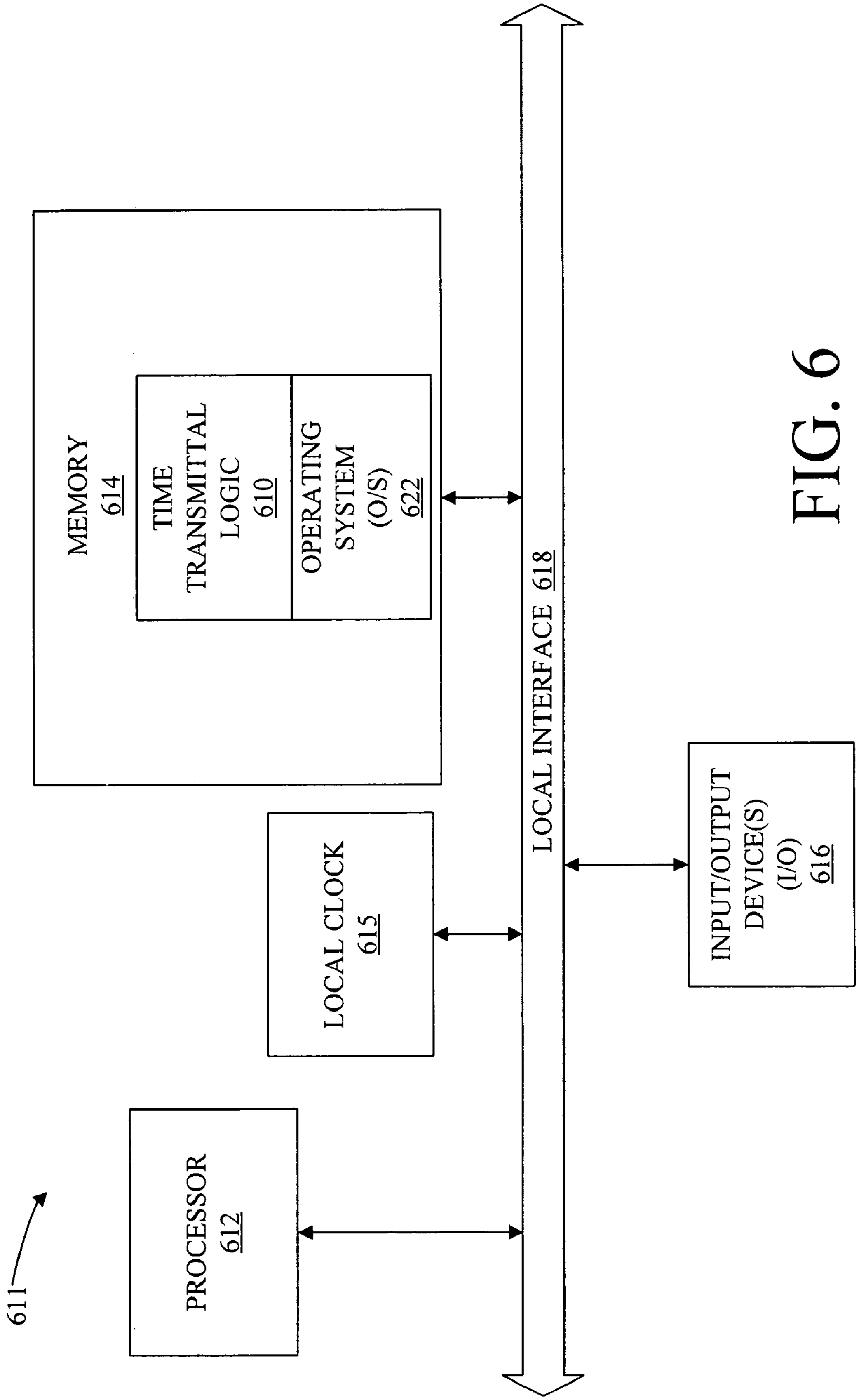
FIG. 6 is a block diagram of a general-purpose computer that can implement a system for transmitting timing information across a manufacturing network in accordance with FIG. 1.

Generally, in terms of hardware architecture, as shown in FIG. 6, the computer 611 includes a processor 612, memory 614, local clock 615, and one or more input and/or output (I/O) devices 616 (or peripherals) that are communicatively coupled via a local interface 618. The local interface 618 may include address, control, and/or data connections (e.g., port 1040) to enable appropriate communications among the aforementioned components. The I/O devices 616 may include input devices, for example but not limited to, a keyboard, mouse, scanner, microphone, etc. Furthermore, the I/O devices 616 may also include output devices, for example but not limited to, a printer, display, etc. Finally, the I/O devices 616 may further include devices that communicate both inputs and outputs, for instance but not limited to, a modulator/demodulator (modem; for accessing another device, system, or network 130), a radio frequency (RF) or other transceiver, a telephonic interface, a bridge, a router, etc.

In the example of FIG. 6, software in the memory 614 includes time transmittal logic 610 in accordance with an embodiment of the present disclosure and a suitable operating system (O/S) 622. When the time transmittal logic 610 is implemented in software, as is shown in FIG. 6, it should be noted that the system 610 can be stored on any computer readable medium for use by or in connection with any computer related system or method.

Any process descriptions or blocks in flowcharts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. Also, various embodiments of the present disclosure can be implemented in hardware, software, firmware, or a combination thereof.

Therefore, having thus described the invention, at least the following is claimed:

1. A system for synchronizing computer time in a computer manufacturing environment, comprising:

a computer network with a server maintaining timing information, the server communicatively coupled to a newly assembled computer via the computer network, wherein the computer network is localized within the manufacturing environment and not connected to external networks;

time configuration logic which can be executed on the newly assembled computer which performs a synchronization process, the synchronization process comprising:

retrieving timing information from the server;

configuring a local clock on the newly assembled computer to a date and time corresponding to the timing information; and storing time zone information obtained from the timing information on a restricted area of a hard drive of the newly assembled computer; and time transmittal logic which can be executed on the server which performs the action of transmitting the timing information over the computer network.

2. The system of claim 1, further comprising:

an installation process which can be executed on the newly assembled computer which performs the actions of automatically configuring time settings maintained by an operating system of the newly assembled computer according to timing information maintained on the local clock of the newly assembled computer and stored in the restricted area.

3. The system of claim 1, further comprising a newly manufactured computer system connected to the network and a synchronization process executing on the newly manufactured computer system.

4. The system of claim 1, further comprising:

a download process which can be executed on the newly assembled computer which performs the actions of retrieving software from a data server on the computer network and installing software from the data server on a hard drive of the assembled computer.

5. The system of claim 4, wherein the synchronization process is initiated as part of a diagnostic testing process after the download process.

6. The system of claim 4, wherein the synchronization process is initiated as part of the download process.

7. The system of claim 4, wherein the computer network is a restricted network within a manufacturing facility.

8. The system of claim 1, wherein the server periodically transmits timing information at least every thirty seconds.

9. The system of claim 1, wherein the synchronization process performs the action of adjusting incoming timing information by clock skew detected on the incoming timing information.

10. A system for synchronizing computer time in a computer manufacturing environment, comprising:

means for transmitting timing information over a computer network to be used in synchronizing an internal clock of a manufactured computer system with the timing information wherein the computer network is localized within the computer manufacturing environment and not connected to external networks;

means for receiving the timing information from the computer network;

means for setting an internal clock of the manufactured computer system to correspond to received timing information; and means for storing time zone information obtained from the timing information on a restricted area of a hard drive of the manufactured computer system.

11. The system of claim 10, further comprising:

means for tracking the manufactured computer system within the manufacturing process, wherein the means for tracking enables the manufactured computer system to retrieve the timing information.

12. The system of claim 10, further comprising:

means for automatically setting a software clock of an operating system of the manufactured computer system upon initial startup of the operating system by a user; and means for automatically setting time zone information for a software application utilized by the manufactured computer system based on the stored time zone information from the restricted area of the hard drive.

13. A method for setting timing information in computer systems by a computer manufacturer, comprising the steps of:

assembling hardware components into a predetermined hardware configuration to create a computer system;

transmitting timing information over a computer network for synchronizing an internal clock of the computer system with the timing information, wherein the computer network is localized within a manufacturing environment and not connected to external networks;

retrieving the timing information via the computer system from the computer network;

setting an internal clock of the computer system to correspond to retrieved timing information; and storing time zone information obtained from the timing information on a restricted area of a hard drive of the assembled computer system.

14. The method of claim 13, wherein the transmit step occurs at least every thirty seconds.

15. The method of claim 13, further comprising the step of:

monitoring the computer network for recently transmitted timing information.

16. The method of claim 13, further comprising the step of:

automatically setting a clock maintained by an operating system of the assembled computer system upon initial startup of the operating system by a user.

17. The method of claim 16, further comprising the step of:

automatically setting time zone information for a software application utilized by the assembled computer system based on the stored time zone information from the restricted area of the hard drive.

18. A method for configuring timing information in a manufacturing environment, comprising the steps of:

monitoring a manufacturing network for newly transmitted timing information;

detecting newly transmitted timing information;

retrieving the newly transmitted timing information; and setting an internal clock of an assembled computer system to correspond substantially to retrieved timing information.

19. A method for transmitting timing information in a manufacturing environment, comprising the steps of:

maintaining accurate timing information; and periodically transmitting the accurate timing information over a manufacturing network, such that the accurate timing information is used to set a local clock of a newly manufactured computer that is listening on the manufacturing network.

20. A computer readable medium having a computer program for configuring timing information within a manufacturing environment, the program performing the steps of:

monitoring a manufacturing network for newly transmitted timing information;

detecting newly transmitted timing information;

retrieving the newly transmitted timing information; and setting an internal clock of a newly assembled computer system to correspond substantially to retrieved timing information.

* * * * *